US009851702B2

(12) United States Patent
Carli

(10) Patent No.: US 9,851,702 B2
(45) Date of Patent: Dec. 26, 2017

(54) ASSISTANCE SYSTEM FOR STEERING A MACHINE TOOL

(75) Inventor: Louis Carli, Marsfield (AU)

(73) Assignee: INTERACTIVE MACHINE SYSTEMS PTY LIMITED, Marsfield, New South (AU)

( * ) Notice: Subject to any disclaimer, the term of this patent is extended or adjusted under 35 U.S.C. 154(b) by 709 days.

(21) Appl. No.: 13/882,627

(22) PCT Filed: Nov. 10, 2011

(86) PCT No.: PCT/AU2011/001451
§ 371 (c)(1),
(2), (4) Date: Apr. 30, 2013

(87) PCT Pub. No.: WO2012/061890
PCT Pub. Date: May 18, 2012

(65) Prior Publication Data
US 2013/0218322 A1 Aug. 22, 2013

(30) Foreign Application Priority Data
Nov. 10, 2010 (AU) .............................. 2010904998

(51) Int. Cl.
*G06F 19/00* (2011.01)
*G05B 15/02* (2006.01)
(Continued)

(52) U.S. Cl.
CPC ........... *G05B 15/02* (2013.01); *B23Q 1/0045* (2013.01); *B23Q 15/007* (2013.01); *B23Q 17/2414* (2013.01)

(58) Field of Classification Search
USPC ....... 700/184, 186, 160, 180; 409/13, 22, 26
See application file for complete search history.

(56) References Cited

U.S. PATENT DOCUMENTS 5,172,326 A * 12/1992 Campbell, Jr. ...... B23K 26/032
                                                    700/134
5,175,688 A * 12/1992 Sasaki ................ G05B 19/4069
                                                    700/180
(Continued)

FOREIGN PATENT DOCUMENTS

CA      2 025 004 A1    3/1991
DE  10 2008 014869 A1   9/2009
(Continued)

OTHER PUBLICATIONS

International Search Report for PCT/AU2011/001451, dated Dec. 22, 2011; ISA/AU.
(Continued)

*Primary Examiner* — Kidest Bahta
(74) *Attorney, Agent, or Firm* — Harness, Dickey & Pierce, P.L.C.

(57) ABSTRACT

The invention relates to systems for steering machine tools and in particular to systems that display information to an operator of the machine tool. Such a system comprises a manually controlled cutting tool. The system receives data that defines a model of a desired cut to be made on a workpiece by the cutting tool. The system receives further data related to the current position of the cutting tool in, at least, two dimensions. A processor generates from the received data a display. The display shows the desired cut to be made and a cutting tool icon at the current position of the cutting tool relative to the desired cut. The display also shows an indication of the current error between either the current position, or direction of travel, of the cutting tool and the desired cut. An operator does not need to look at the workpiece, a drawing and the Digital Read Out simultaneously as with existing systems.

28 Claims, 5 Drawing Sheets

(51) Int. Cl.
*B23Q 17/24* (2006.01)
*B23Q 1/00* (2006.01)
*B23Q 15/007* (2006.01)

(56) References Cited

U.S. PATENT DOCUMENTS

| | | | | |
|---|---|---|---|---|
| 5,255,201 | A * | 10/1993 | Maeda | G05B 19/40937 700/173 |
| 5,315,523 | A * | 5/1994 | Fujita | G05B 19/4069 700/180 |
| 5,406,494 | A * | 4/1995 | Schuett | G05B 19/41 318/569 |
| 5,631,658 | A * | 5/1997 | Gudat | A01B 79/005 342/357.31 |
| 5,831,857 | A * | 11/1998 | Clarino | B26D 5/007 178/18.01 |
| 6,073,058 | A * | 6/2000 | Cossen | G05B 19/4093 700/182 |
| 6,167,324 | A * | 12/2000 | Gorman | B23D 59/001 700/171 |
| 6,447,223 | B1 * | 9/2002 | Farah | G05B 19/41 318/570 |
| 6,493,602 | B1 | 12/2002 | Kranitzky | |
| 7,484,783 | B2 * | 2/2009 | Jager | B60P 1/26 296/26.08 |
| 7,831,292 | B2 * | 11/2010 | Quaid | A61B 34/20 345/156 |
| 8,011,283 | B2 * | 9/2011 | Takase | B23D 45/044 83/471.3 |
| 2002/0117021 | A1 * | 8/2002 | Nakahira | G05B 19/404 74/813 R |
| 2007/0067059 | A1 * | 3/2007 | Travez | B23Q 15/12 700/160 |
| 2007/0095122 | A1 | 5/2007 | Voeller | |
| 2007/0250204 | A1 * | 10/2007 | Ould | G05B 19/401 700/181 |
| 2008/0105094 | A1 * | 5/2008 | McMurtry | B23Q 15/12 82/118 |
| 2008/0120506 | A1 * | 5/2008 | Yamauchi | H04L 63/0442 713/176 |
| 2009/0240367 | A1 * | 9/2009 | Takahashi | B23B 29/125 700/160 |
| 2009/0248194 | A1 * | 10/2009 | Lammering | G05B 19/4163 700/173 |
| 2010/0012972 | A1 * | 1/2010 | Kouvetakis | C01B 6/06 257/183 |

FOREIGN PATENT DOCUMENTS

| | | |
|---|---|---|
| EP | 592383 A1 | 4/1994 |
| GB | 2 086 570 A | 5/1982 |
| JP | 01-210250 A | 8/1989 |

OTHER PUBLICATIONS

Supplemental European Search Report dated May 22, 2017 from a corresponding EP application No. 11839721.5.

* cited by examiner

ASSISTANCE SYSTEM FOR STEERING A MACHINE TOOL

CROSS-REFERENCE TO RELATED APPLICATIONS

This application is a 371 U.S. National Stage of International Application No. PCT/AU2011/001451, filed on Nov. 10, 2011, which claims priority to Australian Patent Application No. 2010904998, filed Nov. 10, 2010, the contents of which are hereby incorporated by reference in their entirety as if fully set forth herein.

TECHNICAL FIELD

The invention relates to systems for steering machine tools and in particular to systems that display information to an operator of the machine tool.

BACKGROUND

Many different tools exist for cutting materials into shapes at various speeds, economical requirements, and other circumstances. These tools range from hand tools such as scissors and hand saws to power tools, which are characterised by a motor supplying the cutting force. Power tools are further classified into hand held power tools, such as electrical hand held drills or chain saws, and stationary power tools such as milling machines, lathes, plasma cutters, and the like. Stationary power tools are usually referred to as machine tools. These comprise a power driven cutting tool, which moves relative to a workpiece and removes part of the material from the workpiece.

This relative movement between the workpiece and the tool may be either manually controlled by an operator who steers the machine tool or by a computer numerical control (CNC) or numerically controlled (NC) which controls actuators, such as servo motors, to move the workpiece or the cutting tool to create the desired shape.

In cases of manually controlled machine tools, the operator receives a specification in form of a hard copy drawing and is then required to reproduce the cut shown in the drawing as accurately as possible on the workpiece. With existing digital readout systems, the controller reads the current coordinates of the cutting tool in relation to the workpiece from a numerical display. The movement of the cutting tool in different axes is manually controlled by separate hand controls. The operator is required to use these hand controls while simultaneously observing the cutting tool, the workpiece, the display, and the drawing. The operator needs to be experienced in order to be able to achieve satisfactory accuracy.

SUMMARY

In a first aspect the invention is an assistance system for steering a machine tool comprising a manually controlled cutting tool, the assistance system comprising:
  A first data port to receive data defining a model of a desired cut to be made on a workpiece by the cutting tool.
  A second data port to receive data related to the current position of the cutting tool in, at least, two dimensions.
  A processor to generate from the received data a display showing:
    the desired cut to be made, a cutting tool icon at the current position of the cutting tool relative to the desired cut, and
    an indication of the current error between either the current position, or direction of travel, of the cutting tool and the desired cut.

The current invention provides an assistance system that graphically displays the desired cut together with the cut made and the current error. An operator can rely on the display, which, according to this invention, shows all the information needed. Therefore, the operator does not need to look at the workpiece, a drawing and the Digital Read Out (DRO) simultaneously as with existing systems. It is shown that the screen displays information which was previously not available to the operator. As a result, the assistance system enables the operator to achieve greater accuracy and repeatability for complex machine operations in less time when compared to conventional read out systems.

The assistance system increases the capability of what work a manual machine tool can achieve. This will allow companies/operators who might not have the money, expertise or space to upgrade to a CNC more competitive.

At an average cost for a CNC machining centre the assistance system would be a $\frac{1}{50}^{th}$ of the price with minimal training required as compared to a CNC.

The assistance system will allow for an increased control of the machine tool by the operator.

In a second aspect the invention is a method for steering a machine tool comprising a manually controlled cutting tool, the method comprising:
  receiving data defining a model of a desired cut to be made on a workpiece by the cutting tool,
  receiving data related to the current position of the cutting tool in, at least, two dimensions,
  generating a display to show:
    the desired cut to be made, the current position of the cutting tool relative to the desired cut, and
    an indication of the current error between either the measured position, or direction of travel, of the cutting tool and the desired cut.

In a third aspect the invention is a machine tool comprising a manually controlled cutting tool and an assistance system for steering the machine tool, the assistance system comprising:
  A first data port to receive data defining a model of a desired cut to be made on a workpiece by the cutting tool,
  A second data port to receive data related to the current position of the cutting tool in, at least, two dimensions,
  A processor to generate from the received data a display showing:
    the desired cut to be made, a cutting tool icon at the current position of the cutting tool relative to the desired cut, and
    an indication of the current error between either the current position, or direction of travel, of the cutting tool and the desired cut.

In a fourth aspect the invention is a software, that when installed on a computer causes the computer to perform the method.

The data defining a model of a desired cut to be made on a workpiece by the cutting tool may be a representation of a drawing.

The data defining a model of a desired cut to be made on a workpiece by the cutting tool may be position data of the cutting tool.

The first data port and second data port may be combined to one single port.

The display may also show an indication of the current feed rate.

The display may also show an indication of the error between the current feed rate and a predetermined feed rate.

The display may also show a visually enhanced or magnified deviation of the cutting tool in relationship to the desired cut.

The display may also show a magnified area of the desired cut and the cut made.

The display may also show a smooth directional cut path back to the desired cut.

The display may show a historical path of the cutting tool relative to the workpiece.

The display may also show numerical values of the current measured position of the cutting tool.

The desired cut may be of the shape of one or more lines or points.

The display may also show the distance of the cutting tool from a predetermined point.

The display may also show a stop icon, wherein the distance of the stop icon from a predetermined point is based on the distance of the cutting tool from that predetermined point.

The display may be generated periodically from updated values for the received data.

The second data port may be a USB (universal serial bus) port connected to a high speed data acquisition device to receive signals from linear or rotary encoders and to send packets of data to the processor via USB when that information is required by the assistance system.

The machine tool may be a milling machine, plasma cutter, borer, drill, radial drill, lathe, wood working machine, plastic cutter, or fabric cutter.

The material of the workpiece may be metal, wood, plastic or fabric.

The appearance of the indication of the current error may be based on whether the current position of the cutting tool has crossed the desired cut.

The indication of the current error may comprise an indication of a predetermined tolerance.

The indication of the current error may comprise a marker and a scale and the position of the marker relative to the scale may be based on the error.

BRIEF DESCRIPTION OF THE DRAWINGS

Examples of the invention will now be described with reference to the accompanying drawings in which.

BEST MODES OF THE INVENTION

Figure 1A:
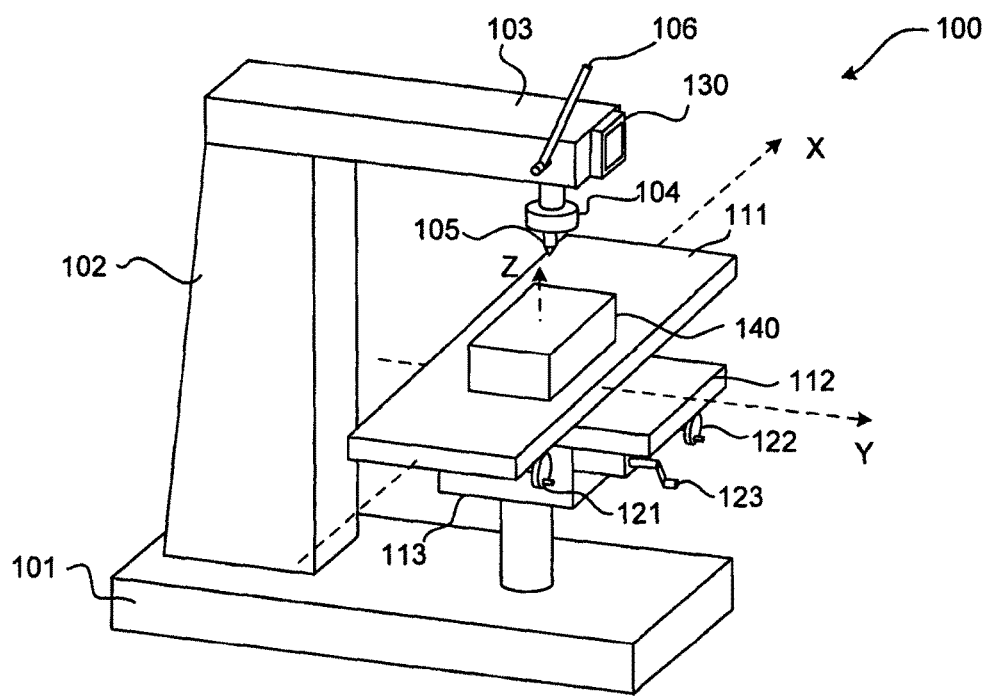
FIG. 1(a) illustrates a milling machine.

FIG. 1(a) illustrates a milling machine 100 comprising a base 101 and a column 102 standing on base 101. An over arm 103 extends from the top of column 102 and holds a spindle 104, which points downwards from the over arm 103 and receives a cutting tool 105. A lever 106 is rotatably mounted at the side of the over arm 103. A table 111 is located under the cutting tool 105, is slidably engaged with a saddle 112 and movable in direction of the x- and y-axis. The saddle 112 is mounted on a knee 113, which is secured to base 101 and is movable in direction of the z-axis. A table feed hand wheel 121 extends from under the table 111. A crossfeed hand wheel 122 and a vertical feed crank 123 extend from the knee 113. A touch screen 130 is mounted on over arm 103 and a workpiece 140 is secured to table 111.

In operation, the spindle and the cutting tool rotate driven by an electric motor (not shown) inside the milling machine 100. An operator uses the hand wheels 121 and 122 and the crank 123 to adjust the position of the table and the lever 106 to lower the cutting tool.

The table can be adjusted in three dimensions. The position in x-direction is adjusted using the table feed hand wheel 121, in the y-direction using the crossfeed handwheel 122, and in the z-direction using the vertical feed crank 123. The operator moves the workpiece upwards into the rotating cutting tool 105 until a desired cutting depth is reached. The operator then steers the cutting tool 104 through the workpiece to create the desired shape. The operator may also first position the workpiece 140 under the cutting tool 105 and then rotate the lever 106 to drive the cutting tool 105 downwards into the workpiece 140.

The current position of the workpiece in x, y, and z-direction is measured by line encoders (not shown) and the position data is displayed on touch screen 130.

Currently available Digital Read Out (DRO) systems show the current position of the workpiece in the form of numbers on the display. This is useful when moving the workpiece in one direction only. However, cuts having complex shapes include directions which are not parallel with any of the three axis. Therefore, an operator needs to operate more than one hand wheel simultaneously. In particular, it is quite common to operate the table feed hand wheel 121 and the crossfeed hand wheel 122 simultaneously without changing the depth of the milling by the vertical feed crank 123. The operator constantly observes how the cutting tool 105 moves through the workpiece 140 and may have some markers on the workpiece 140 such as scribed lines to follow. Additionally, the operator also reads the display of position information and relates this information to specifications to make sure that the requirements are met. Having available only numerical values it is hard for the operator to determine whether the currently followed path of the cutting tool 105 through the workpiece 140 is in accordance with the requirements.

Therefore, the current invention provides an assistance system that graphically displays a computer model of the desired path of the cutting tool 105 through the workpiece 140 together with a computer model of the cut made and the error of the current position or the direction of travel as described in the following. The operator can completely rely on the display, which, according to this invention, shows all the information needed. Therefore, the operator does not need to look at the workpiece 140, a drawing and the screen 130 simultaneously. It is shown that the screen displays information which was previously not available to the operator. As a result, the assistance system enables the operator to achieve greater accuracy and repeatability for complex machine operations in less time when compared to conventional DROs.

Figure 1B:
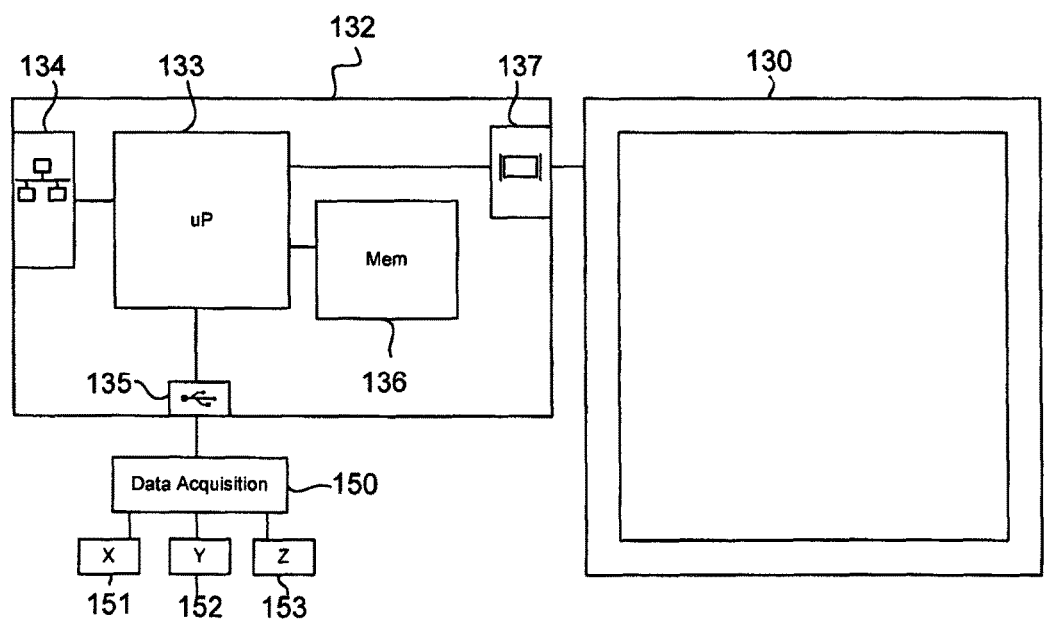
FIG. 1(b) illustrates hardware components of an assistance system for steering a machine tool.

FIG. 1(*b*) illustrates hardware components of an assistance system for steering a machine tool comprising a computer system 132 and a touch screen 130. The computer system 132 includes a processor 133, which is connected to a first data port 134 and a second data port 135. The processor is also connected to a memory 136, and a display port 137. The touch screen 130 is connected to the display port 137. In this example, the first data port 134 is an Ethernet port and the second data port is a universal serial bus (USB) data port. The USB port is connected to a data acquisition device 150, which in turn is connected to three encoders 151, 152, and 153. Alternatively, the processor 133 may be connected to the data acquisition device via the Ethernet port and a local area network. As a further alternative, the processor 133 may be connected directly to the encoders using one data port of the processor 133 for each encoder. These data ports of the processor 133 may also comprise analog/digital converters for receiving analog signals from the encoders 151, 152, and 153.

When in use, the processor 133 operates under instruction of software, which is stored on memory 136. The processor 133 receives from the Ethernet port 134 an electronic representation of a drawing of a desired cut and stores this drawing in the memory. The processor 133 then builds a computer model of the desired cut to me made on the workpiece 140. Next, the processor 133 receives data packets on demand from the high speed data acquisition device which reads signals from encoders 151, 152, and 153 to give the current position of the cutting tool 105 in x, y, and z direction respectively. The processor 133 stores these values in the memory 136 and builds a computer model of the cut made by the cutting tool on the workpiece 140. Then, the processor 133 generates a display for touch screen 130 to show the desired cut to be made, the current measured position of the cutting tool relative to the desired cut, the cut made, and an indication of the current error between either the measured position, or direction of travel, of the cutting tool and the desired cut. The display also includes areas which represent buttons on the touch screen 130. By touching the screen 130 at these areas the operator activates the buttons which are displayed on the screen 130. This way the operator configures the display as described in further detail below.

The following figures show several displays of the proposed assistance system in use in different situations. In this example, an operator has prepared a drawing on a personal computer (PC) using a software for technical drawings. After the operator exported the drawing to a format that is compatible with the assistance system, the operator connects the PC to the data port 134 of the assistance system. The connection may be established via an Ethernet cable or via a wireless connection. The PC and the assistance system may also be both connected to the Internet and the communication is established via the Internet.

Once the connection is established, the operator uploads the drawing onto the assistance system. The uploading procedure may be facilitated by the processor 133 providing a website. The website is displayed by the PC once the operator enters the internet address of the assistance system. The website includes a text field to enter the filename of the exported drawing and a button which initiates the upload once the operator clicks on that button. The website may also provide a graphical file browser for selecting the file to be uploaded. In a different example, the operator creates the drawing directly on the assistance system either by a standard CAD software or by a special purpose reverse engineering CAD software, both of which are integrated into the assistance system. As shown in FIG. 1(*a*) the machine tool comprises manual controls. These manual Controls are used as an input device similar to a computer mouse to create and manipulate the drawings. This is especially useful for replicating shapes which have already been created on a template piece. The template piece is secured on the table 111 in FIG. 1(*a*) and the cutting tool is deactivated so that it does not cut the template piece upon contact. The operator moves the cutting tool along the shapes of the template piece and the CAD software creates the drawing from the data received from the encoders and stores the drawing on the memory 136. After creating the drawing from the existing template piece the operator removes the template piece from the table 111.

Once the operator has uploaded or created the drawing, the operator secures the workpiece 140 on table 111 and starts producing the shapes from the drawing.

Figure 2:
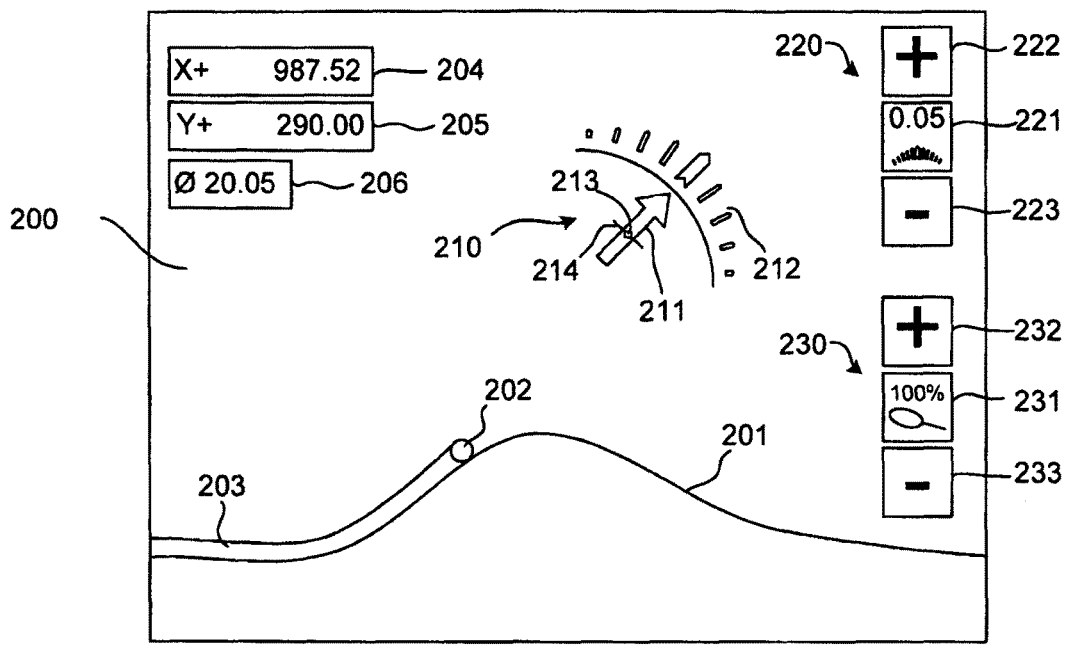
FIG. 2 illustrates a graphical display where a cutting tool follows a line of a desired cut.

In the example of FIG. 2 the operator follows a line of a desired cut accurately at the recommended speed while observing the display on touch screen 130. The display on the touch screen 130 is updated periodically according to a predetermined update frequency such as 10 Hz. The following examples illustrate snapshots of the periodically updated display. FIG. 2 illustrates a graphical display 200 comprising a vector line representation of a desired cut 201 to be made in a workpiece, a cutting tool icon 202 representing the measured position of the cutting tool 105 in FIG. 1(*a*) relative to the desired cut 201, and a representation of the cut made 203, that is material that has been removed by the cutting tool 105. Further displayed is information regarding the cutting tool 105 including a numeric x-coordinate display 204 of the current x-position of the cutting tool 105, a numeric y-coordinate display 205 of the current y-position of the cutting tool, and a diameter display 206 of the cutting tool. The display 200 also includes an assistance widget 210 comprising a direction arrow 211, an angular scale 212, a feed rate indicator 213 and an optimal feed rate marker 214. The display also comprises a first configuration interface 220 for displaying 221, increasing 222, and decreasing 223 the angular resolution of the angular scale 212 and a second configuration interface 230 for displaying 231, increasing 232, and decreasing 233 the zoom level of the display of the desired cut 201, the cut made 203, and the cutting tool icon 202.

After the drawing is uploaded onto the assistance system a computer model of the desired cut in the form of line 201 is derived from that drawing. The operator then steers the cutting tool 105 by operating the table feed and crossfeed hand wheels 121 and 122. The operator observes the display in order to make sure that the cutting tool icon 202 follows the line of the desired cut 201 as closely as possible. The operator keeps the centre of the cutting tool icon 202 away from the line of the desired cut 201 by the radius of the cutting tool, which is half of the value displayed by the diameter display 206. In the following, this cutter compensation is automatically considered by the assistance system unless it is otherwise noted. Using currently available read-out systems the operator reads the x-coordinate display 204 and the y-coordinate display 205 to obtain the current position of the cutting tool 105.

The graphical display of the desired cut 201, the cutting tool icon 202, and the cut made 203 and the assistance widget 210 give the operator more information about the current direction and speed of the cutting tool 105 than existing systems. The operator may change the zoom level to display a smaller region of the computer model in more detail by activating the increase button 232 of the second configuration interface 230. Alternatively, the operator may activate the decrease button 233 of the second configuration interface 230 to display a larger region of the computer model in less detail.

The direction arrow 211 indicates the current direction of the cutting tool 202. In a different example the arrow indicates the distance from the desired cut. The direction of the direction arrow 211 is determined by an algorithm creating a cut path perpendicular offset tool. The angular scale 212 indicates an optimal direction by a pronounced central marker and also the degree of deviation to both sides. If the desired cut 201 is not a straight line, the pronounced central marker rotates according to the current direction of the desired cut as the operator steers the cutting tool 105 along the desired cut 201. The operator observes the assistance widget 210 and uses the hand wheels 121 and 122 to steer the cutting tool into the direction indicated by the pronounced marker of the angular scale 212.

If the operator follows the desired cut 201 exactly, the direction arrow 211 points to the pronounced marker of the angular scale 212. On the other hand, if the operator deviates from the desired cut 201, the arrow 211 changes direction to notify the operator that correction is needed. The operator can determine from the display qualitatively and quantitatively how accurately the cut made 203 follows the desired cut 201. If the cutter deviates from the desired cut far enough so that the markers on the angular scale 212 cannot represent that amount of movement, the assistance system will rotate the icon to guide the operator back to the desired cut path 201.

The operator adjusts the resolution of the angular scale 212 by using the first configuration interface 220. For rough first cuts, accuracy is not the main concern and the operator sets the resolution of the angular scale 212 to a coarser level, such as scale of 1:1 or greater, by activating increasing button 222. The resolution display 221 shows the current resolution of the angular scale. As a result of the coarser resolution, the direction arrow 211 changes direction to a lesser degree for small deviations. The operator notices large deviations from the desired cut 201 but small deviations are hardly visible. For more accurate cuts, such as fine engravings, the operator sets the resolution of the angular scale to a finer level, such as 0.05 mm, by activating the decreasing button 223. With such a fine resolution, the operator notices greater changes of the direction arrow 211 when only slightly deviating from the desired cut 201. Larger deviations cause the arrow to reach the bounds of the angular scale 212. The setting of 220 will also govern the direction, distance and curvature of the angular scale 212 to calculate a cut path to guide the operator to move the cutter 105 back to the desired cut 201. Fine settings of 0.05 mm will create an aggressive return to the desired cut path whereas a smoother return to the cut path would be made in a coarser setting of 0.1 mm.

The operator also observes the feed rate indicator 213 to keep track of the current feed rate of the cutting tool 105 through the workpiece 140. The operator tries to maintain the feed rate indicator 213 as close as possible to the optimal feed rate marker 214. If the operator steers the cutting tool 105 too quickly through the workpiece 140 the feed rate indicator 213 moves towards the tip of the direction arrow 211. Vice versa, if the operator moves too slowly, the feed rate indicator 213 moves towards the base of the direction arrow 211. In case of FIG. 2 the operator follows the desired cut exactly at the recommended speed. With this invention the accuracy of the cut made is constantly assessed by the operator without looking at the workpiece. The display shows the quantitative and qualitative information necessary to follow the desired cut.

Figure 3:
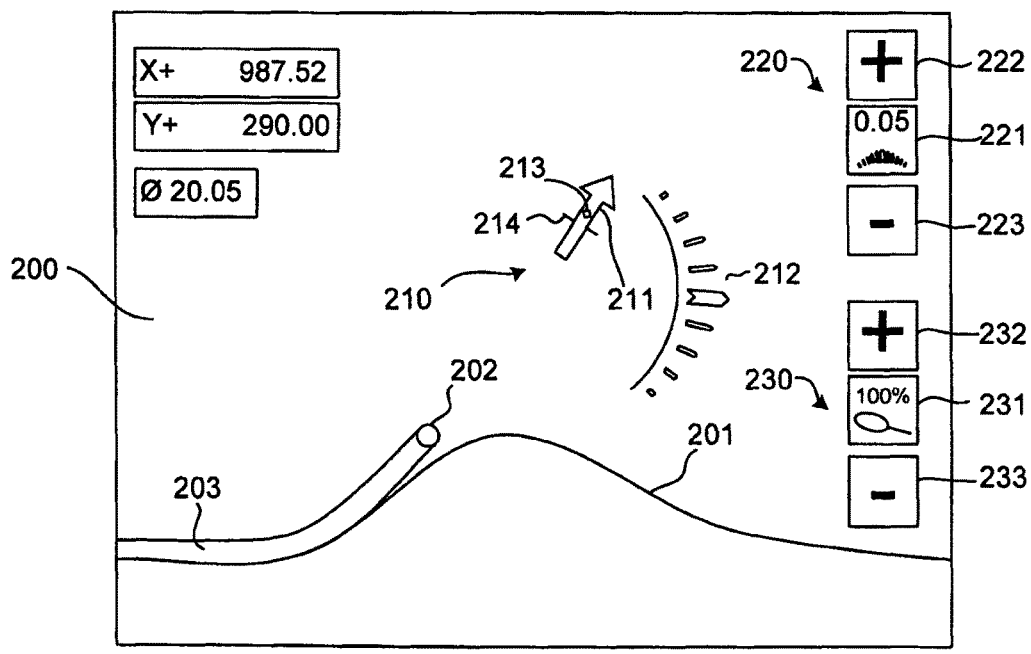
FIG. 3 illustrates the display where the cutting tool deviates from the line of the desired cut.

FIG. 3 shows the display 200 again but this time the operator did not follow the desired cut exactly. The display 200 shows how the cutting tool icon 202 has deviated from the desired cut 201. There is a gap between the cut that has been made 203 and the desired cut 201. As a result of the deviation from the desired cut the direction arrow 211 of the assistance widget 210 does not point to the pronounced marker of the angular scale anymore. The angular scale 212 has rotated to create a cut path back to the desired cut. The operator can clearly determine, by how far the cutting tool 105 has deviated from the optimal direction. As mentioned above, the direction arrow 211 changes more if the resolution is set to a fine level and changes less if the resolution is set to a coarse level. The operator now compensates for the deviation and steers the cutting tool 105 closer to the desired cut 201. In this example, the feed rate indicator 213 is not aligned with the optimal feed rate marker 214 either. This shows that the operator is moving too fast and should slow down in order to meet the recommended feed rate.

Figure 4:
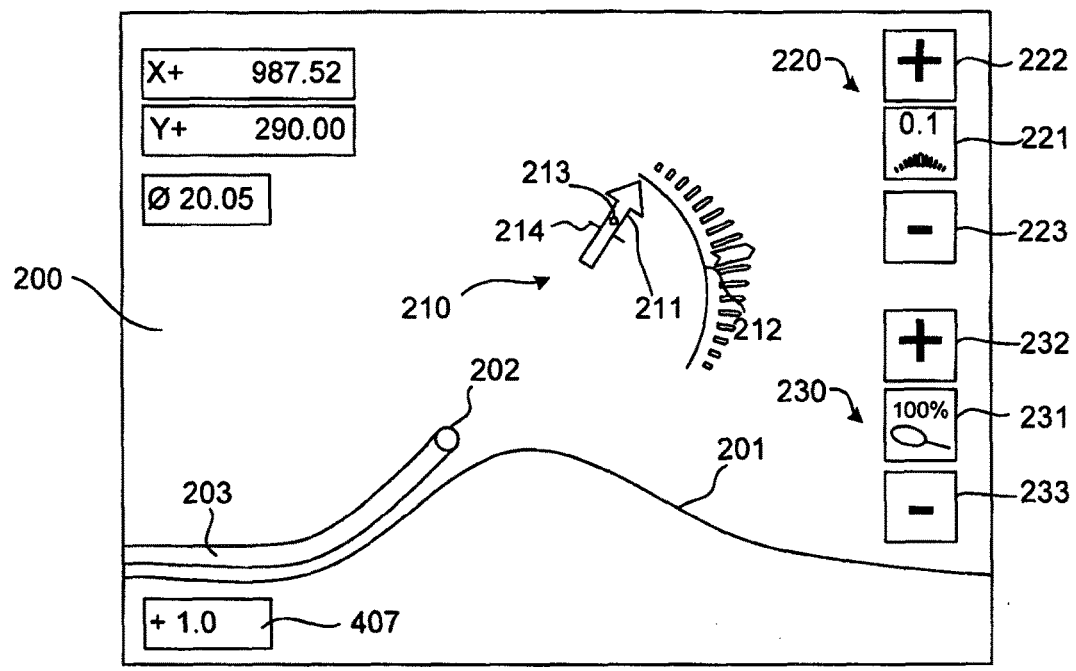
FIG. 4 illustrates the display where an offset of the cutting tool from the line of the desired cut is specified and the cutting tool deviates from the desired cut.

FIG. 4 shows a similar display 200 as above but now also comprising an offset display 407. The value in the offset display 407 represents the desired offset, which is a constant distance between the final cut path and the current cut path. Therefore, the operator does not follow the desired cut closely but keeps a constant distance of the cutting tool icon 202 from the desired cut 201. In this example, the offset is set to 1.0 mm. It can also be seen that now the operator has chosen an angular resolution which is less accurate than in the previous figures. The resolution display 221 shows a value of 0.1 and as a result, the angular scale 212 comprises more markers which are closer together.

As above, the operator deviates from the desired direction shown by direction arrow 211 and the feed rate is also too high as the feed rate indicator 213 shows. The angular scale 212 now shows a more gradual redirection back to the desired cut than in FIG. 3

Figure 5:
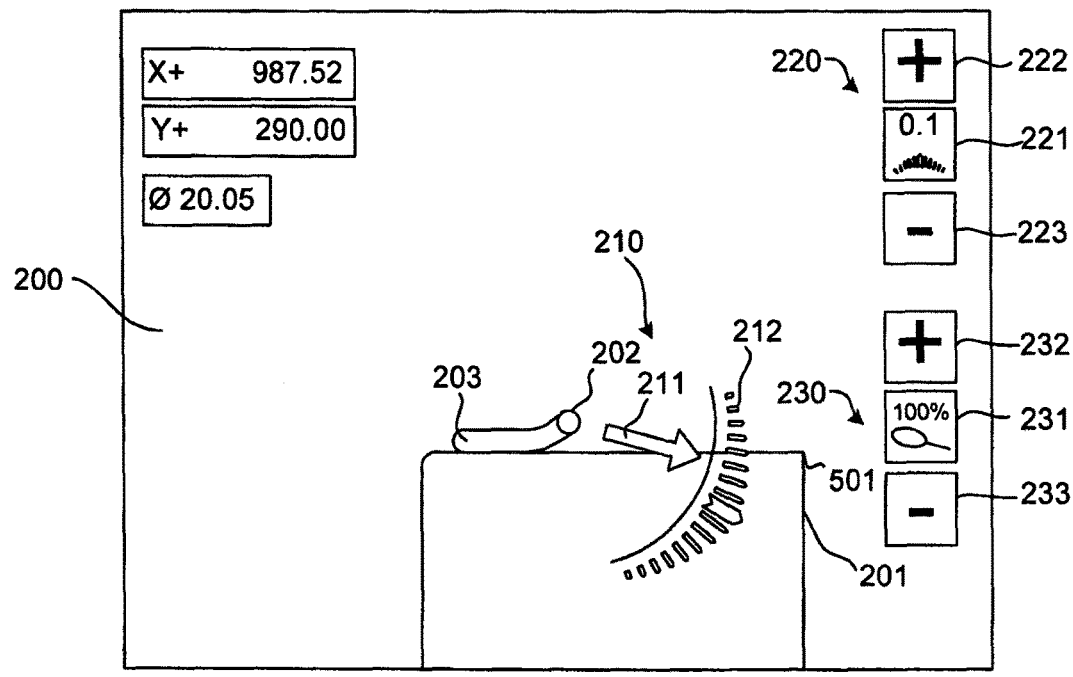
FIG. 5 shows another example of the display where the direction arrow points back to the desired cut.

FIG. 5 shows another example of display 200 where the assistance widget 210 operates in a slightly different manner. The operator deviates from the desired cut 201 but in this example, the direction arrow 211 points in a direction back to the desired cut 201. The assistance widget 210 is also located in close proximity to the cutting tool icon 202.

The angular scale is rotated further than the direction arrow such that the distance between the tip of the direction arrow 211 and the pronounced marker of the angular scale 212 indicates the distance of the cutting tool icon 202 from the desired cut. This indication is amplified for greater accuracy according to the setting of the resolution as displayed by the resolution display 221. The operator can follow the direction arrow regardless of whether the operator deviates from the desired cut 201 or exactly follows it. In the ideal case, when the operator exactly follows the desired cut 201, the direction arrow 211 is parallel to the desired cut 201 and points at the pronounced marker of the angular scale 212.

The centre point for the rotation of both the direction arrow 211 and the angular scale 212 lies at the centre of the cutting tool icon 202. As a result, the direction arrow 211 always points away from the cutting tool icon 202 and is easy to follow by the operator.

In most applications a deviation from the desired cut 201 away from the workpiece is less critical than a deviation into the workpiece. To indicate the criticality of moving into the workpiece the markers of the angular scale may be colour coded such that markers that indicate cutting into the workpiece have a distinctive colour such as red. In the example of FIG. 5, the markers located in clockwise direction from the central pronounced marker are coloured red. When the operator moves the cutting tool icon 202 over the desired cut 201 and therefore cuts too far into the workpiece, the direction arrow 211 changes to a distinctive colour, such as red.

If the distance from the desired cut 201 is too large to be represented by the angular scale 212 at the current setting of the resolution, the angular scale 212 disappears from the display 200.

In the example of FIG. 5, the operator steers the cutting tool icon 202 back to the desired cut 201 according to the assistance widget 210 and then follows the desired cut 201 until the cutting tool 202 reaches a corner 501. As the cutting tool icon 202 moves over the corner it reaches a point where the operator needs to stop and change direction abruptly. At this point, the direction arrow 211 and angular scale 212 are rotated such that the direction arrow 211 points into the new direction. In this example the new direction is vertically downwards.

Naturally, the operator is not able to stop at the exact point where the direction changes but continues horizontally by a small amount before the operator notices the change of the direction arrow 211. In that case, the direction arrow 211 is rotated slightly towards the desired cut to guide the operator in correcting the error of moving too far in the horizontal direction. As long as the operator reaches the desired cut 201 before the cutting tool has moved downwards by more that the radius of the cutting tool, the corner 501 of the desired cut 201 is still cut out exactly.

Figure 6:
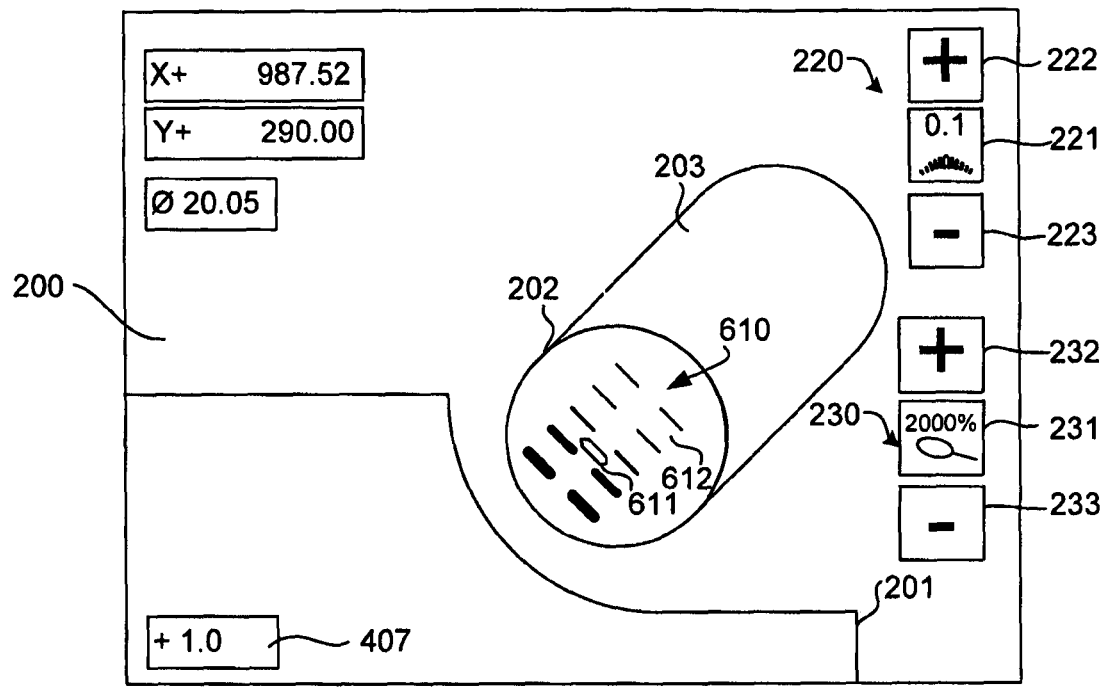
FIG. 6 illustrates another example in which the operator has chosen a high zoom level for approaching and following a curvature of the desired cut.

FIG. 6 shows another example in which the operator has chosen a high zoom level for approaching and following a curvature of the desired cut 201. At such a high zoom level the direction arrow 211 in the previous figures is not practical since the main objective is not to follow the direction of the desired cut 201 but to approach the desired cut 201. FIG. 6 shows a assistance widget 610 for indicating the distance of the cutting tool icon 202 to the desired cut 201. The assistance widget 610 comprises a marker 611 and a linear scale 612. The linear scale 612 represents a magnification of the distance between the cutting tool icon 202 and the desired cut 201.

As the operator approaches the desired cut 201 with the cutting tool 202, the marker 611 also moves down the linear scale 612. Due to the magnification, the marker 611 moves a greater distance than the cutting tool 202. This allows for more accurate steering by the operator. When the edge of the cutting tool 202 is located exactly on the desired cut 201, the marker 611 is aligned with the bottom line of the linear scale 612. If the operator steers the cutting tool 202 too far and over the desired cut 201, the marker moves outside the scale 612 and changes colour to alarm the operator.

The linear scale 612 extends in a direction perpendicular to the desired cut 201, that is perpendicular to a tangent of the desired cut at the point on the desired cut 201 that is closest to the cutting tool 202. As a result, the linear scale 612 rotates as the operator moves along the curvature of the desired cut 201.

Many specifications for cuts also include the specification of a tolerance, such as +0.21-0.1 mm, or a specification of a tolerance grade such as H7. Referring back to FIG. 5, a sector of the angular scale 212 represents a deviation from the desired cut 201 that is within the specified tolerance. This sector may be shaded to indicate to the operator that the deviation must stay within the shaded area. Similarly, referring to FIG. 6, a section of the linear scale 612 may be shaded to indicate the tolerance for the distance error when approaching the desired cut 201 at a high zoom level. The direction arrow 211 in FIG. 5 and the marker 611 in FIG. 6 change colour if they move outside the shaded sector or section.

Figure 7:
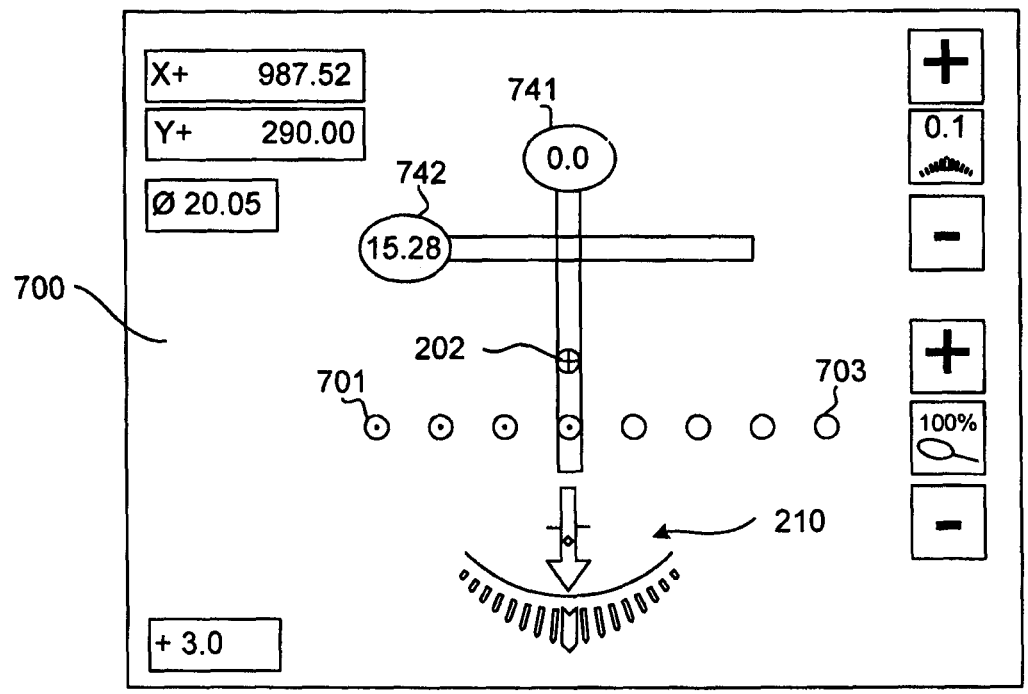
FIG. 7 illustrates the display for drilling holes at specified locations.

FIG. 7 shows a different display 700 for assisting the operator. In this example, the task is not to follow a line of a desired cut but to drill holes at predefined positions. The process for the operator is slightly different as the operator positions the cutting tool 105 while it is placed above the wokpiece 140. Once the cutting tool 105 is positioned, the operator moves the workpiece 140 into the cutting tool 105 by operating vertical feed crank 123 or moves the cutting tool 105 downwards into the workpiece 140 by operating the lever 106. The rotational movement of the lever 106 is limited to a constant range, such as 45 degrees, and for each hole the operator rotates the lever over the entire range. As a result, each time the cutting tool moves down it moves by the same distance and therefore, the cutting tool 105 produces holes with constant depth each time the operator rotates the lever. Using the lever, the operator can move the cutting tool up and down faster and therefore, drill holes faster than using the vertical feed crank 123. Moving the workpiece up or down by the use of the vertical feed crank 123 before actuating the lever 106, the operator can adjust the depth of the holes.

In addition to some of the features described above, such as the cutting tool icon 202 and the assistance widget 210, the display 700 comprises markers for the desired positions of holes 701, markers for holes already cut 703, a first pre-emptive stop icon (x-PESI) 741 and a second preemptive stop icon (y-PESI) 742. Note that the cutter compensation is automatically removed for operations such as drilling.

The two PESIs are annotated with numbers which indicate to the operator the distance of the cutting tool 105 from the desired hole. Once the operator has steered the cutting tool 105 to the desired position of the hole, both numbers are zero and the PESIs intersect exactly at the position of the hole. In this example, the operator has used the table feed hand wheel 121 to align the current x-position of the cutting tool 105 with the x-position of the hole. Therefore, x-PESI 741 overlaps with the hole and is annotated with 0.0, which tells the operator that no further adjustment with the table feed hand wheel 121 is necessary. The y-PESI 742 is not aligned with the hole to indicate to the operator that the cutting tool 202 needs to be positioned further in the direction of the y-axis using the crossfeed hand wheel 122.

As the operator directs the cutting tool icon 202 further towards the desired hole, the operator observes how the y-PESI 742 also moves towards the desired hole and the annotation of the y-PESI 742 decreases. Once the y-PESI 742 also aligns with the desired hole and the annotation of the y-PESI 742 has decreased to 0.0 the operator stops the movement of the cutting tool 105 and moves the cutting tool downwards into the workpiece by actuating the lever 106 to cut the hole. Note that the PESIs 741 and 742 move faster than the cutting tool icon towards the desired position as they start from further away.

The advantage is that the operator can use a fairly coarse zoom level to display the entire array of holes and as soon as the operator positions the cutting tool icon 202 closer to the desired position of the hole, the PESIs 741 and 742 move into the display. Observing the position of the PESIs 741 and 742, the operator determines the distance of the cutting tool 202 from the desired position of the hole in a finer zoom level than the underlying display of the holes. As a result, fine deviations from the desired position are visualised, which otherwise would not be visible at the current zoom level.

Figure 8:
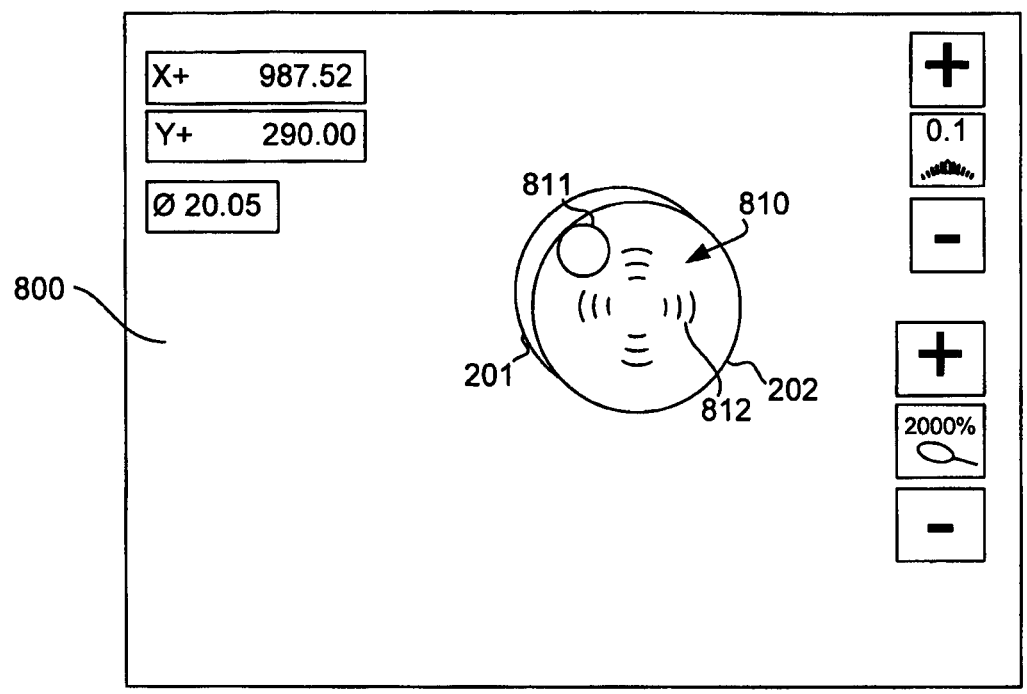
FIG. 8 illustrates a second example of the display for drilling holes.

FIG. 8 illustrates a second example of a display 800 for drilling holes such as the hole 201. Similar to the examples above, the display 800 comprises the desired cut 201 in the form of a hole, the cutting tool icon 202 and an assistance widget 810 located at the centre of the cutting tool 202. In this example, the assistance widget 610 comprises a round marker 811 and a circular scale 812. As can be seen in FIG. 8, the difference between the centre of the circular scale 812 and the round marker 811 is the magnification distance between the centre of the cutting tool icon 202 and the centre of the hole 201.

As the operator steers the cutting tool 202 closer to the hole 201, the round marker 811 moves closer to the centre of the circular scale 812. When the round marker 811 is located at the centre of the circular scale 812, the hole 201 and the cutting tool icon 202 are aligned and the operator lowers the drill into the workpiece.

Figure 9:
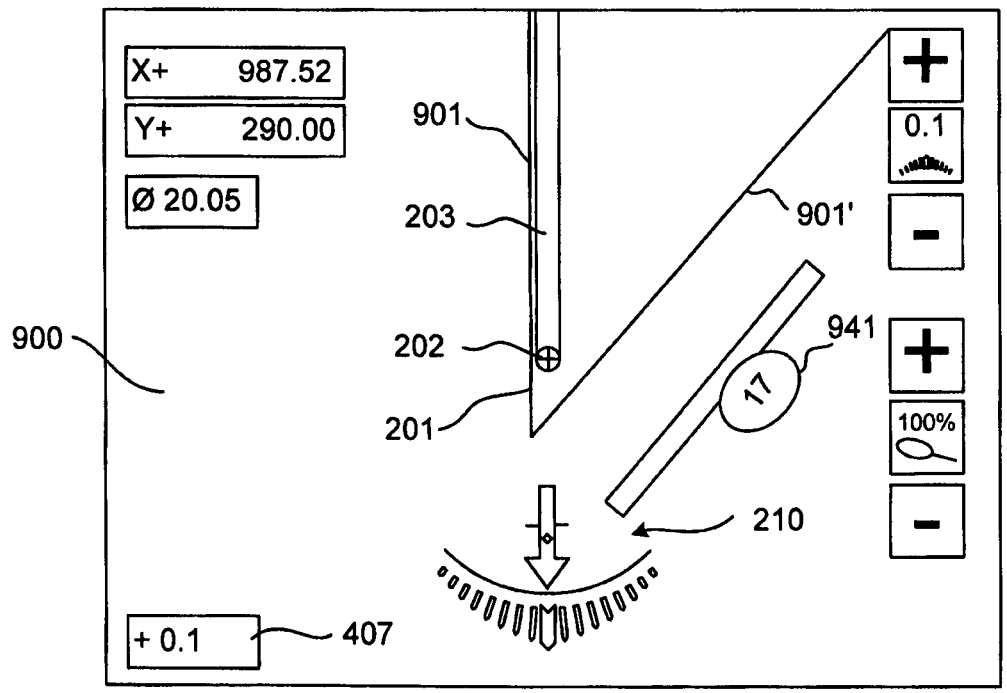
FIG. 9 illustrates the display where a cutting tool follows a line of a desired cut and approaches an acute angle.

FIG. 9 shows yet another display 900 again comprising the desired cut 201, which now consists of two straight line segments 901 and 901', a cutting tool icon 202, a cut made 203, an assistance widget 210, and an offset display 407. In addition, a PESI 941 is shown. In this example, the desired cut 201 includes an acute angle between the two lines 901 and 901' and as a result, the round cutting tool icon 202 can not completely follow the line of the desired cut 201. If the cutting tool icon 202 followed the line 901 from the position shown in the figure, it would eventually cut through line 901' before reaching the turning point where the two lines meet. The operator needs to approach line 901' while following line 901 and stop when the distance of the cutting tool 202 from the line 901' is exactly the offset value shown in the offset display 901. Once the operator steers the cutting tool icon 202 close to line 901', the operator notices that PESI 941 moves into the display 900 to warn the operator about approaching line 901'. In this example, this happens when the cutting tool 105 is within 17 mm before machining a line not being tracked by the assistance widget. Similar to FIG. 5, the PESI 941 shows the distance between the cutting tool 202 and the line 901' in a finer zoom level than the desired cut 201 and the cutting tool 202 are shown. While steering the cutting tool 202 closer to line 901', the operator observes the PESI 941 moving closer to the line from the opposite direction. Once the annotation of the PESI 941 shows the offset value, 0.1 mm in this example, and the PESI is aligned with line 901' the operator changes direction to follow line 901'. Alternatively, the operator may change the cutting tool 202 to a tool with a smaller diameter in order to move further into the acute angle between lines 901 and 901'.

The proposed system determines the need for PESIs automatically from the drawings and the measured current position of the cutting tool 105. As a result, the operator can be assured that once the drawing has been loaded onto the milling machine, the display will notify the operator of any stop points, or turning points that will be encountered during the processing of the workpiece.

Once the milling of the workpiece 140 is finished the cut made 203 is stored as vector graphic and associated to one particular workpiece 104. This historical path of the cutting point or face relative to the workpiece can later be used for quality assessment and quality monitoring.

The assistance system as described above can similarly be used for different types of machine tools such as plasma cutters, borers, drills, radial drills, lathes and the like. The assistance system requires as input a drawing of the desired cut as a vector drawing and the output of linear encoders to determine the current position of the cutting tool. Machines fitted with digital readouts (DRO) have linear encoders already built in. Therefore, the assistance system may be installed together with new DRO installations or as a DRO upgrade. The assistance system may also be installed by retro-fitting machines such as lathes or radial drills. Of course new machines such as plasma cutters, wood working machines, plastic and fabric cutters can be fitted with the described assistance system as well.

It will be appreciated by persons skilled in the art that numerous variations and/or modifications may be made to the invention as shown in the specific embodiments without departing from the scope of the invention as broadly described. It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data streams along a local network or a publicly accessible network such as the internet.

It should also be understood that, unless specifically stated otherwise as apparent from the following discussion, it is appreciated that throughout the description, discussions utilizing terms such as "processing" or "computing" or "calculating", "building" or "predicting" or "estimating" or "determining" or "displaying" or "identifying" or "receiving" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. An assistance system for steering a machine tool comprising a manually controlled cutting tool, the assistance system comprising:
   a first data port to receive data defining a model of a desired cut to be made on a workpiece by the cutting tool,
   a second data port to receive data related to the current position of the cutting tool in, at least, two dimensions,
   a processor to generate from the received data a display showing:
      the desired cut to be made, a cutting tool icon at a current position of the cutting tool relative to the desired cut, an indication of a current error between either the current position, or direction of travel, of the cutting tool and the desired cut,
a scale,
which rotates to navigate an operator back to the desired cut, and markers, which measure with graduations the current error between the cutting tool and the desired cut.

2. The assistance system of claim 1, wherein the data defining a model of a desired cut to be made on a workpiece by the cutting tool is a representation of a drawing.

3. The assistance system of claim 1, wherein the data defining a model of a desired cut to be made on a workpiece by the cutting tool is position data of the cutting tool.

4. The assistance system of claim 1, wherein the first data port and second data port are combined to one single port.

5. The assistance system of claim 1, wherein the display also shows an indication of a current feed rate.

6. The assistance system of claim 1, wherein the display also shows an indication of an error between a current feed rate and a predetermined feed rate.

7. The assistance system of claim 1, wherein the display also shows a visually enhanced or magnified deviation of the cutting tool in relationship to the desired cut.

8. The assistance system of claim 1, wherein the display also shows a magnified area of the desired cut and the cut made.

9. The assistance system of claim 1, wherein the display shows a historical path of the cutting tool relative to the workpiece.

10. The assistance system of claim 1, wherein the display also shows numerical values of a current measured position of the cutting tool.

11. The assistance system of claim 1, wherein the desired cut is of a shape of one or more lines or points.

12. The assistance system of claim 1, wherein the display also shows a distance of the cutting tool from a predetermined point.

13. The assistance system of claim 1, wherein the display also shows a stop icon, wherein a distance of the stop icon from a predetermined point is based on a distance of the cutting tool from that predetermined point.

14. The assistance system of claim 1, wherein the display is generated periodically from updated values for the received data.

15. The assistance system of claim 1, wherein the second data port is a USB (universal serial bus) port connected to a high speed data acquisition device to receive signals from linear or rotary encoders and to send packets of data to the processor via USB when that information is required by the assistance system.

16. The assistance system of claim 1, wherein the machine tool is a milling machine, plasma cutter, borer, drill, radial drill, lathe, wood working machine, plastic cutter, or fabric cutter.

17. The assistance system of claim 1, wherein a material of the workpiece is metal, wood, plastic or fabric.

18. The assistance system of claim 1, wherein an appearance of the indication of the current error is based on whether the current position of the cutting tool has crossed the desired cut.

19. The assistance system of claim 1, wherein the indication of the current error comprises an indication of a predetermined tolerance.

20. The assistance system of claim 1, wherein the indication of the current error comprises a marker and a scale and the position of the marker relative to the scale is based on the error.

21. A method for steering a machine tool comprising a manually controlled cutting tool, the method comprising:
receiving data defining a model of a desired cut to be made on a workpiece by the cutting tool,
receiving data related to the current position of the cutting tool in, at least, two dimensions,
generating a display to show:
the desired cut to be made, a current position of the cutting tool relative to the desired cut,
an indication of a current error between either a measured position, or direction of travel, of the cutting tool and the desired cut,
a scale,
which rotates to navigate an operator back to the desired cut, and markers, which measure with graduations the current error between the cutting tool and the desired cut.

22. A machine tool comprising a manually controlled cutting tool and an assistance system for steering the machine tool, the assistance system comprising:
a first data port to receive data defining a model of a desired cut to be made on a workpiece by the cutting tool,
a second data port to receive data related to a current position of the cutting tool in, at least, two dimensions,
a processor to generate from the received data a display showing:
the desired cut to be made, a cutting tool icon at the current position of the cutting tool relative to the desired cut,
an indication of a current error between either the current position, or direction of travel, of the cutting tool and the desired cut,
a scale,
which rotates to navigate an operator back to the desired cut, and markers, which measure with graduations the current error between the cutting tool and the desired cut.

23. The assistance system of claim 1, wherein the scale is a linear scale that rotates to maintain perpendicularity with a tangent of the desired cut at a point on the desired cut that is closest to the cutting tool, and the linear scale includes linearly disposed markers to navigate the operator back to the desired cut.

24. The assistance system of claim 1, wherein the scale is an angular scale having angular markers and the angular scale rotates to navigate the operator back to the desired cut.

25. The method of claim 21, wherein the scale is a linear scale that rotates to maintain perpendicularity with a tangent of the desired cut at a point on the desired cut that is closest to the cutting tool, and the linear scale includes linearly disposed markers to navigate the operator back to the desired cut.

26. The method of claim 21, wherein the scale is an angular scale having angular markers and the angular scale rotates to navigate the operator back to the desired cut.

27. The assistance system of claim 22, wherein the scale is a linear scale that rotates to maintain perpendicularity with a tangent of the desired cut at a point on the desired cut that is closest to the cutting tool, and the linear scale includes linearly disposed markers to navigate the operator back to the desired cut.

28. The assistance system of claim 22, wherein the scale is an angular scale having angular markers and the angular scale rotates to navigate the operator back to the desired cut.

\* \* \* \* \*